United States Patent
Wang et al.

(10) Patent No.: US 8,873,047 B2
(45) Date of Patent: Oct. 28, 2014

(54) DISPERSIVE ELEMENT, SPECTROMETER AND METHOD TO SPECTRALLY SEPARATE WAVELENGTHS OF LIGHT INCIDENT ON A DISPERSIVE ELEMENT

(71) Applicant: ams AG, Unterpremstatten (AT)

(72) Inventors: Yu Wang, Kemp, TX (US); David Mehrl, Plano, TX (US); Greg Stoltz, Flower Mound, TX (US); Kerry Glover, Rockwall, TX (US)

(73) Assignee: ams AG, Unterpremstaetten (AT)

( * ) Notice: Subject to any disclaimer, the term of this patent is extended or adjusted under 35 U.S.C. 154(b) by 5 days.

(21) Appl. No.: 13/737,850

(22) Filed: Jan. 9, 2013

(65) Prior Publication Data
US 2013/0176564 A1    Jul. 11, 2013

Related U.S. Application Data

(60) Provisional application No. 61/585,128, filed on Jan. 10, 2012.

(30) Foreign Application Priority Data

Jan. 26, 2012   (EP) .................................... 12152715

(51) Int. Cl.
| | | |
|---|---|---|
| *G01J 3/28* | (2006.01) | |
| *G02B 27/42* | (2006.01) | |
| *G02B 27/10* | (2006.01) | |
| *G02B 5/06* | (2006.01) | |
| *G01J 3/14* | (2006.01) | |
| *G01J 3/02* | (2006.01) | |
| *G02B 3/12* | (2006.01) | |

(52) U.S. Cl.
CPC .  *G01J 3/28* (2013.01); *G02B 27/42* (2013.01); *G02B 27/1006* (2013.01); *G02B 5/06* (2013.01); *G01J 3/14* (2013.01); *G01J 3/02* (2013.01); *G02B 3/12* (2013.01)
USPC ......................................................... 356/326

(58) Field of Classification Search
USPC .................................. 356/300, 326, 328, 334
See application file for complete search history.

(56) References Cited

U.S. PATENT DOCUMENTS

| | | | |
|---|---|---|---|
| 5,754,290 A | | 5/1998 | Rajic et al. |
| 6,081,331 A | * | 6/2000 | Teichmann .................... 356/328 |
| 6,965,483 B2 | * | 11/2005 | Lindblom ..................... 359/726 |
| 2004/0179784 A1 | | 9/2004 | Vancoille et al. |

FOREIGN PATENT DOCUMENTS

| | | |
|---|---|---|
| EP | 0303138 | 8/1990 |
| WO | 01/86848 | 11/2001 |

* cited by examiner

*Primary Examiner* — Abdullahi Nur
(74) *Attorney, Agent, or Firm* — McDermott Will & Emery LLP

(57) ABSTRACT

A dispersive element is disclosed which is designed to receive incident light (1) and disperse the incident light (1) into multiple spatially separated wavelengths of light. The dispersive body (DB) comprises a collimation cavity (COLL) to collimate the incident light (1), at least two optical interfaces (PRIS) to receive and disperse the collimated light (2) and a collection cavity (CLCT) to collect the dispersed light (3) from the at least two dispersive interfaces (op1, op2) and to focus the collected light (4).

13 Claims, 2 Drawing Sheets

Figure 1A:
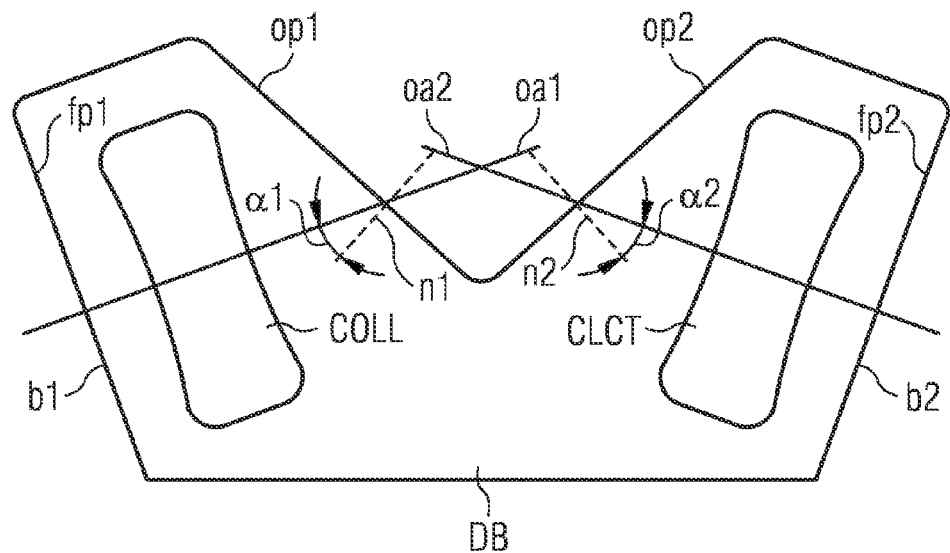

DISPERSIVE ELEMENT, SPECTROMETER AND METHOD TO SPECTRALLY SEPARATE WAVELENGTHS OF LIGHT INCIDENT ON A DISPERSIVE ELEMENT

REFERENCE TO RELATED APPLICATIONS

This application claims priority to European Application number 12152715.4, filed on Jan. 26, 2012 and U.S. Provisional Patent Application No. 61/585,128, filed on Jan. 10, 2012, all of which is herein incorporated by reference.

DESCRIPTION

Dispersive element, spectrometer and method to spectrally separate wavelengths of light incident on a dispersive element This invention relates to a dispersive element, to a spectrometer and to a method to spectrally separate wavelengths of light incident on a dispersive element Optical spectrometers are indispensible tools in the analysis and characterization of matter and are routinely used in both basic and applied sciences. A spectrometer allows for separating light into a spectrum of frequencies or wavelengths. Analysis of spectra, for example by determining emission and adsorption lines, line broadening or line shifting, allows to derive a vast amount of parameters giving insight into material properties, chemical composition or state of matter to name but a few.

A spectrometer usually contains a dispersive element like a prism or grating. Such an element is able to separate light radiation according to frequency or wavelength by sending light of different wavelengths onto different positions on the focal plane of a light sensor array. Such arrays are sensitive to light of different wavelengths including IR, Vis and UV.

A prism-based spectrometer typically comprises two lenses or lens-systems and a prism arranged in a common optical setup. A collimation lens receives light from a spectral source which usually radiates electromagnetic radiation incident on a thin slit. The collimation lens collimates the light, i.e. light beams are essentially parallel after passing the lens. The collimated light is then radiated through the prism and split, or more precisely, dispersed into different wavelength components each having different angle. Such colored light is then collected by a collection lens and recorded by a light sensor array which is placed at the focal plane of the lens.

All spectrometer elements need to be precisely mounted and aligned in a rigid frame, which make makes prism-based optical spectrometers bulky and costly.

It is an objective to the present invention to provide a dispersive element, a spectrometer and a method to spectrally separate wavelength of light incident on a dispersive element which is less bulky and costly.

This objective is achieved by the subject matter of the independent claims. Further embodiments are subject to dependent claims.

According to an aspect of the invention a dispersive element is designed to receive incident light and disperse the incident light into multiple spatially separated wavelengths of light. The dispersive element has a dispersive body comprising a collimation cavity, at least two optical interfaces and a collection cavity arranged in a common optical setup.

In the following the term cavity denotes a hollow mold which may be partly exposed to its ambient surroundings. A cavity in this sense may also be completely enclosed by a material, e.g. the material of the dispersive body. In any case the cavity is characterized by a refractive index lower than the refractive index of the surrounding material. Furthermore, the term optical interface relates to a surface of optical precision. An optical interface constitutes a boundary layer. Light penetrating through that interface experiences a change of index of refraction, either from high to low or low to high index. Consequently, light is refracted at the interface. In the following, if not stated otherwise, the term light refers to electromagnetic radiation in the visible regime between 400 nm and 800 nm.

Light incident on the dispersive element, e.g. entering the element through an appropriate entrance aperture, is collimated into parallel beams using the collimation cavity. The at least two optical interfaces are positioned in such a way to receive the collimated light one after the other. The optical interfaces constitute an optical boundary surface and the collimated light experiences refraction when received by one of the optical interfaces. Preferably, the dispersive body has a higher index of refraction then the space covered by the optical interfaces.

Because of the dispersion of refractive index associated with the dispersive body, light is dispersed when passing the first optical interface and further dispersed when entering the second optical interface. The second optical interface constitutes an optical boundary layer with a difference in refractive index so that refraction takes place.

Finally, the collection cavity is positioned such as to receive the dispersed light from the at least two optical interfaces. The collected light is focused onto a focal plane of the collection cavity.

The dispersive element is made from a single dispersive body which comprises all optical elements, i.e. collimation and collection cavity as well as the at least two optical interfaces. Preferably, the dispersive body is made from a rigid material such as plastic by means of an injection molding process. This way the optical elements have optical grade precision and are precisely aligned. The dispersive element replaces expensive optical prisms or gratings and multi-lens spectrometer setups currently on the market. It costs much less to fabricate, and advanced and bulky means to align the optical elements in a rigid frame are not necessary. Furthermore, the optical elements need no further alignment and alignment is permanently preserved as the elements are integral parts of the dispersive body. This renders the dispersive element rather insensitive to mechanical shock and changes such as thermal expansion.

In the injection molding process, material is fed into a heated barrel, mixed, and forced into a mold form where it cools and hardens to the configuration of the cavity. The dispersive element is designed into a mold from metal, usually either steel or aluminium, and precision-machined to form the features of the desired part, i.e. optical grade collimation and collection cavities and optical interfaces. The molding process results in optical precision and no further processing steps such as polishing or coating are needed, but may be added if a given application demands even higher precision.

According to another aspect of the invention the dispersive body is optically transparent.

Optical transparency describes the physical property of light being able to pass through a material. Preferably transmission lies within the visual spectrum between 400 nm and 800 nm or may even be extended into the near infrared up to 1000 nm and/or ultraviolet. Transparency should be high, for example higher than 50%. The actual choice of material, however, depends on the application and desired spectral range. Criteria include sensitivity of the detector to be used with the dispersive element and desired signal to noise ratio.

According to another aspect of the invention the dispersive body has a high dispersion due to the index of refraction.

In order to achieve reasonable, i.e. resolvable spectral separation of light the material of the dispersive body needs to create a dispersion according to the index of refraction. In order to result in decent spectral resolution, a high dispersion due to index of refraction is desirable. As one example polycarbonate plastic material has an index of refraction between 1.61 at 400 nm to 1.565 in the near infrared at 1000 nm.

According to another aspect of the invention the dispersive body is made of a thermal plastic and a thermal setting plastic material, for instance made of polycarbonate.

Thermal plastic and thermal setting plastic materials show a high degree of transparency in the visual and infrared spectrum. These plastics can also conveniently be fabricated with the injection molding process. Applicable examples include PMMA, polystyrene, styrene and styrene copolymers, polycarbonate, methyl pentene and allyl diglycol carbonate but not limited to these materials. Furthermore, these materials have advantageous thermal properties and feature such as low thermal expansion. Consequently, the optical properties, e.g. optical grade of surfaces and alignment, are maintained over a wide range of temperatures.

According to another aspect of the invention the at least two optical interfaces are comprised by a prism cavity situated inside the dispersive body.

The two optical interfaces constitute refractive surfaces of the prism. The prism cavity can either be a triangular prism or of some other geometrical shape, e.g. Abbé prism, Pellin-Broca prism, Amici prism or compound prism made of more than a single prism cavity.

According to another aspect of the invention the collimation cavity, the collection cavity and the at least two optical interfaces are each comprised by the dispersive body and filled with a material of lower index of refraction compared to the index of refraction (at all wavelength in the visible range) of the dispersive body.

This way the dispersive body is a single piece which is not exposed to its ambient surroundings. Each of the cavities may be filled by a certain given material such as air, some other gas, or even be evacuated.

According to another aspect of the invention the collimation cavity, the collection cavity and the at least two optical interfaces are at least partly open to ambient surroundings.

To allow the cavities to be open to ambient surroundings allows for easier production by using conventional injection molding processing.

According to another aspect of the invention the two optical interfaces are positioned such that light is incident on each of the interfaces at a tilted angle. The tilted angle is defined with respect to surface normals of the at least two optical interfaces, respectively. The tilted angle facilitates refraction at the optical interfaces and may be chosen to allow for desired spectral separation at a detector to be used with the dispersive element.

According to another aspect of the invention the collimation cavity has an optical lens shape and constitutes a cavity inside the dispersive body having a lower index of refraction than the dispersive body itself.

According to another aspect of the invention the connection cavity has optical lens shape and constitutes an air cavity inside the dispersive body having a lower index of refraction than the dispersive body.

According to another aspect of the invention the collimation cavity and/or collection cavity have spherical or cylindrical concave shape.

According to an aspect of the invention a spectrometer comprises a dispersive element as described above, an entrance aperture positioned at a focal plane of the collimation cavity and a detector positioned at a focal plane of the collection cavity to collect the multiple spectrally separated wavelengths of light.

The entrance aperture largely determines the spectral resolution of the spectrometer. Its actual width or dimension may be chosen considering the tradeoff between resolution and signal intensity at the detector. Both entrance aperture and detector may conveniently be attached to the dispersive element in front of the collimation cavity and collection cavity, respectively. However, entrance aperture and/or detector could also be integral parts of the dispersive body and positioned during the molding process.

With entrance aperture and detector attached to or integrated into the dispersive body the dispersive element becomes a compact and robust spectrometer. The dispersive element is made from a single dispersive body which comprises the above mentioned optical elements, i.e. collimation and collection cavity as well as the at least two optical interfaces. Preferably, the dispersive body is made from a rigid material like plastic by means of an injection molding process. This way the optical elements have optical grade precision and are precisely aligned.

The dispersive element replaces expensive optical prisms and multi lens setups and is cheaper to fabricate. Advanced and bulky means to align and fix the optical elements within a rigid frame are not necessary. Furthermore, the optical elements need no further alignment and alignment is preserved as the elements are integral parts of the dispersive body. This renders the whole spectrometer rather insensitive to mechanical shock and changes such as thermal expansion.

According to another aspect of the invention the entrance aperture is a slit, a pinhole or a fiber tip.

A slit may be used with cavities, and especially with the collection cavity, of cylindrical concave shape. A pin hole may be necessary when the cavities are of spherical concave shape. Using a fiber and a fiber tip as the entrance aperture may be convenient to direct different light sources onto the spectrometer.

According to another aspect of the invention the detector is a linear array detector or a two dimensional detector. In particular, the detector may be a charge coupled device (CCD) or a complementary metal oxide semiconductor (CMOS).

The detector used with the spectrometer should have spatial resolution. The spectrally dispersed light collected by the collection cavity focuses different wavelengths at different positions on the detector. After appropriate calibration such a setup has spectral resolution of 5 nm or better at some wavelengths. The achievable resolution depends primarily on the material properties of the dispersive element, i.e. dispersion due to the index of refraction but also on the geometrical dimension of the optical interfaces or the prism cavity.

An aspect of the invention relates to a method to spectrally separate wavelengths of light incident on the dispersive element, in which the dispersive element has a dispersive body comprising a collimation cavity, at least two optical interfaces, and a collection cavity. The method comprises the step of collimating the incident light using the collimation cavity as well as receiving and dispersing the collimating light using the at least two optical interfaces. Finally, dispersed light is collected and focused using the collection cavity.

The method to spectrally separate wavelengths of light incident on the dispersive element allows rather compact construction of the dispersive element and spectrometers which may use the dispersive element. The element can be made from a single dispersive body which comprises the necessary optical elements, i.e. collimation and collection cavity as well as the at least two optical interfaces. The optical elements have optical grade precision and are precisely aligned. Advanced and bulky means to align the optical elements in a rigid frame are not necessary. Furthermore, the optical elements need no further alignment and alignment is permanently preserved as the elements are integral parts of the dispersive body. This renders the dispersive element rather insensitive to mechanical shock and changes like thermal expansion.

In the following, the principle presented above is described in further detail with respect to drawings, in which exemplary embodiments are presented.

Figure 1B:
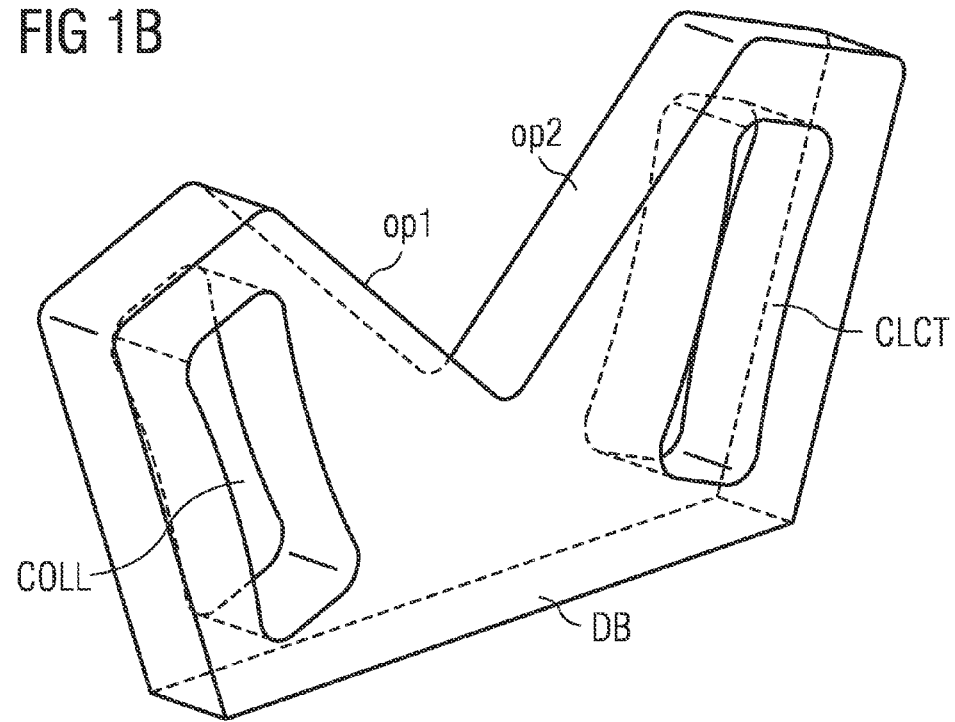
Figure 2:
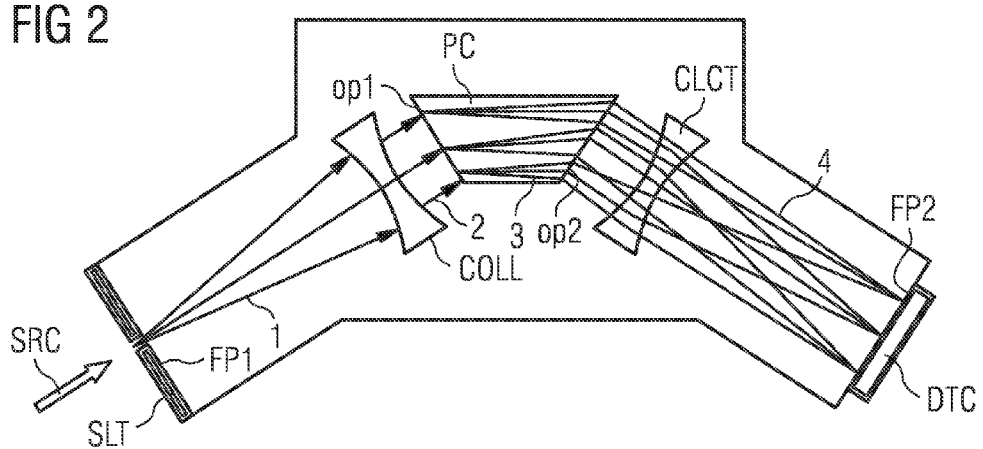
Figure 3:
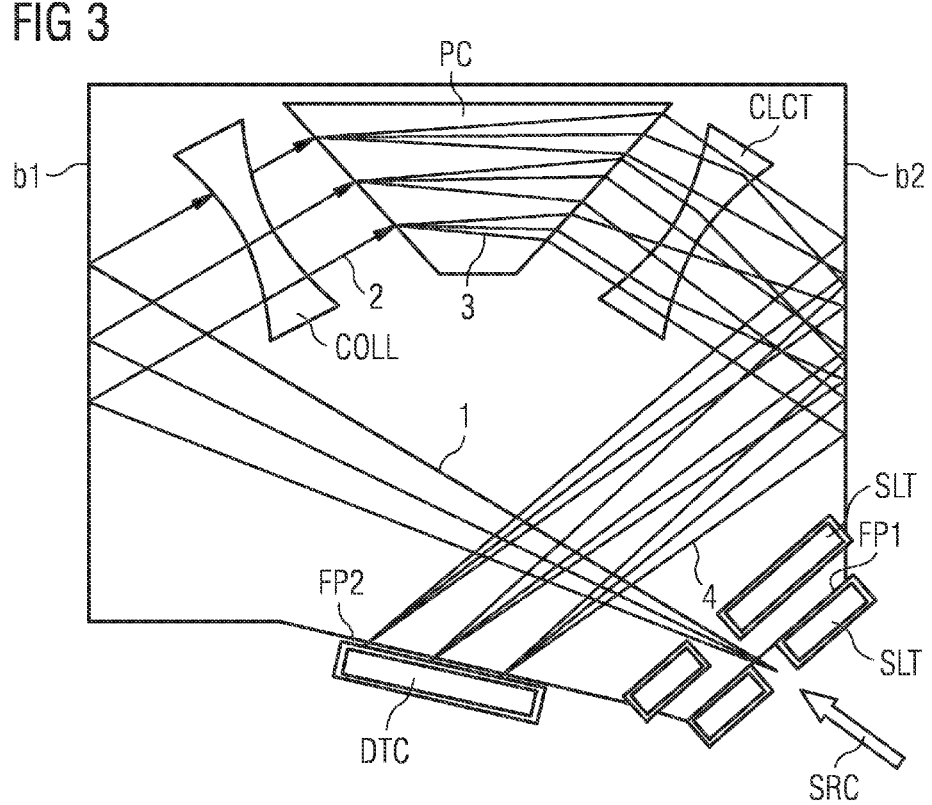

FIG. 1A shows an exemplary embodiment of a dispersive element according to the principle presented, FIG. 1B shows an exemplary embodiment of the dispersive element of FIG. 1B depicted in three dimensions, FIG. 2 shows an exemplary embodiment of a spectrometer according to the principle presented, and FIG. 3 shows another exemplary embodiment of a spectrometer according to the principle presented.

Like reference numerals designate corresponding similar parts or elements.

FIG. 1A shows an exemplary embodiment of a dispersive element according to the principle presented. The dispersive element comprises a dispersive body DB having a collimation cavity COLL, a collection cavity CLCT and two optical interfaces op1, op2.

The dispersive body is framed by a first and second boundary surface b1, b2. A first optical axis oa1 of the collimation cavity COLL is perpendicular to the first boundary surface b1. The collimation cavity COLL is positioned along the first optical axis oa1 with its focal plane fp1 placed at or close to first boundary surface b1. Similarly, a second optical axis oa2 of the collecting cavity CLCT is perpendicular to the second boundary surface b2. The collecting cavity CLCT is positioned along the second optical axis oa2 with its focal plane fp2 placed at or close to second boundary surface b2.

In this exemplary embodiment the two optical interfaces op1, op2 constitute two surfaces of a triangular prism with their respective surfaces positioned along the first and second optical axis oa1, oa2, respectively. However, for each optical interface op1, op2 there is a tilting angle α1, α2 with respect to the optical axis oa1, oa2, respectively. In other words corresponding surface normals n1, n2 of the two optical interfaces op1, op2 include the tilting angle α1, α2, respectively.

In embodiments not shown here the two optical interfaces op1, op2 may be part of a prism structure of different geometry, like for example an Abbé prism, Pellin-Broca prism, Amici prism or compound prism made of more than a single prism cavity. A prism structure may be completely enclosed inside the dispersive body DB or at least partly exposed to its ambient surroundings. In any case it is implied that those skilled in the art would readily adjust the overall optical design to account for different geometries of the two optical interfaces op1, op2 without departing from the principle presented.

Applicable materials for the dispersive body DB should be optically transparent in the visible spectrum and feature high dispersion of refraction. Thermoplastic or thermosetting materials meet both these criteria. But also glass like BK7 could be used in principle. Plastic material has the benefit of allowing easy fabrication of the dispersive element by conventional injecting molding processing.

Optical transmission generally depends on wavelength. High transmission or low absorbance allows for using the dispersive element together with a wide range of detector types whilestill achieving decent signal to noise ratio. Furthermore, it is beneficial if the material shows constant or only slightly changing transmission within the desired wavelength regime. This makes calibration for use in a spectrometer easier.

In order to achieve spectral separation the dispersive element should be composed of a material of high dispersion of index of refraction. Material dispersion originates from a frequency-dependent response to electromagnetic waves, i.e. index of refraction changes with frequency or wavelength. As one example polycarbonate plastic material has an index of refraction of 1.610 at 400 nm, 1.598 at 486.1 nm, 1.586 at 589.3 nm, 1.581 nm at 656.3 nm down to 1.565 in the near infrared at 1000 nm. Applicable materials include PMMA, polystyrene, styrene and styrene copolymers, polycarbonate, methyl pentene and allyl diglycol carbonate. Furthermore, these materials have advantageous thermal properties and feature low thermal expansion coefficients. This way the optical properties, e.g. optical grade surfaces and alignment, are maintained over a wide range of temperatures and may be rather insensitive to mechanical shock.

Collimation and/or collecting cavity should have optical precision surface and shape. This can be achieved by molding. For example, the shape may be spherical or cylindrical concave lenses. Different embodiments are possible. The lenses have two opposing surfaces which may both be cylindrical concave, both spherical concave or a combination with one surface being planar. In principle groups of differently shaped lenses are possible as well.

FIG. 1B shows an exemplary embodiment of the dispersive element of FIG. 1A depicted in three dimensions. The general design is described with respect to the top view of FIG. 1A. The dispersive element preferably has two essentially parallel side surfaces as depicted.

The function of the dispersive element is best explained with reference to a spectrometer (see FIGS. 2 and 3 for details).

FIG. 2 shows an exemplary embodiment of a spectrometer according to the principle presented. The dispersive element is of the kind described above with reference to FIGS. 1A and 1B.

The dispersive body DB is a single piece produced of molded plastic. The plastic is optically transparent and has high optical dispersion due to the refractive index. Placed at the focal plane fp1 of collimation cavity COLL is an entrance slit SLT. Positioned at the focal plane fp2 of collecting cavity CLCT is a detector DTC. The distance between slit SLT and the center of the collimating cavity COLL should be equal to the distance between detector DTC and the center of collecting cavity CLTC.

The two optical interfaces op1, op2 are comprised by a prism cavity PC, e.g. in this case an Amici prism. Collimation cavity COLL, collecting cavity CLCT and prism cavity PC constitute air cavities, i.e. light entering or leaving the cavities undergoes a transition between materials of optically different density. Thus, the light is subject to refraction and dispersion.

Light is emitted from a light source SRC and radiates as incident light 1 through slit SLT and enters collimating cavity COLL. The collimating cavity COLL has two cylindrical concave surfaces functioning as a light collimation lens. Thus, incident light 1 leaves collimating cavity COLL in parallel beams, i.e. as collimated light 2. Collimated light 2 then radiates through the first optical interface op1 of prism cavity PC. As a consequence the collimated light 2 is split into a bundle of dispersed light 3 having different colors at different angles due to light dispersions based on the plastic's index of refraction. The angular separations of the different colors of dispersed light 3 become even larger when passing through the second optical interface op2, i.e. on the right side of prism cavity PC in FIG. 2.

The dispersed light 3 further radiates through collecting cavity CLCT. Similar to collimation cavity COLL, collecting cavity CLCT has two cylindrical concave surfaces functioning as a light collecting lens. Such collected light 4 is focused onto focus plane fp2 positioned at the detector DTC. Different colors or wavelength of light are focused at different positions on the focus plane fp2 because of their angular separations due to dispersion. A linear or two dimensional sensor array mounted at the focus plane fp2 records the light spectrum as a spatially dependent signal.

As an alternative collecting cavity CLCT and cavity COLL can also be of spherically concave shape. Then slit SLT in front of the light source SRC should be a pin-hole instead. As yet another alternative the light source SRC may be a fiber tip. If the tip is small enough, e.g. in the range of few 100 µm in diameter, the entrance slit or pinhole may be omitted.

FIG. 3 shows another exemplary embodiment of a spectrometer according to the principle presented. In this case the dispersive body DB has a different more compact shape and light is internally reflected at critical angles.

In this embodiment light from source SRC is irradiated into the spectrometer by using a double slit structure SLT which is placed in the focus plain FP1 of collimation lens COLL. This prevents stray light from entering into the setup.

The dispersive body is of cuboid shape and first and second boundaries b1, b2 are essentially parallel to each other. The general setup of collimation cavity COLL, prism cavity PC, collecting cavity CLCT is similar to the setup described in FIG. 2. Detector DTC and slit SLT are positioned at the focal plane fp1, fp2 of collecting cavity CLCT and collimation cavity COLL, respectively.

The incident light 1, however, hits the boundary surface b1 under the critical angle such that it is reflected by total internal reflection before being received by collimation lens COLL. The collimated light 2 then, in a similar fashion as in FIG. 2, hits the prism cavity PC and is doubly dispersed into dispersed light 3, i.e. on exiting the prism cavity PC dispersed light 3 is further dispersed and collected by collection lens CLCT. The collected light 4 is directed to the second boundary surface b2 under its critical angle. By total internal reflection collected light 4 is reflected and focused onto detector DTC.

This setup allows for more compact design. By using the total internal reflection at the critical angle, losses are minimized.

Spectrometers of the kind presented above feature compact and rigid design. The dispersive element is a single piece comprising optical elements which are precisely and vigorously aligned to allow for spectroscopy of high resolution. Depending on the overall size of the spectrometer and, in particular, prism cavity PC resolution of few nm can be achieved.

REFERENCE NUMERALS 1 incident light
2 collimated light
3 dispersed light
4 collected light
α1 angle
α2 angle
b1 boundary surface
b2 boundary surface
CLCT collecting cavity
COLL collimation cavity
DB dispersive body
fp1 focal plane
fp2 focal plane
n1 surface normal
n2 surface normal
oa1 optical axis
oa2 optical axis
op1 optical interface
op2 optical interface
PC prism cavity
SLT slit
SRC light source

The invention claimed is:

1. A dispersive element to receive incident light and disperse the incident light into multiple spatially separated wavelengths of light, having a dispersive body made of an optically transparent material and comprising:
   a collimation cavity to collimate the incident light;
   at least two optical interfaces to receive and disperse the collimated light into multiple spatially separated wavelengths of light; and
   a collection cavity to collect the dispersed light from the at least two dispersive interfaces and to focus the collected light,
   wherein the collimation cavity, the collection cavity and the least two optical interfaces are each comprised by the dispersive body and filled with a material of lower index of refraction compared to an index of refraction of the dispersive body.

2. A dispersive element according to claim 1, wherein the dispersive body has a high dispersion of index of refraction.

3. A dispersive element according to claim 1, wherein the dispersive body is made of a thermoplastic or thermosetting plastic material, in particular made of polycarbonate.

4. A dispersive element according to claim 1, wherein the at least two optical interfaces are comprised by a prism cavity situated inside the dispersive body.

5. A dispersive element according to claim 1, wherein the collimation cavity, the collection cavity and the least two optical interfaces are at least partly open to ambient surroundings.

6. A dispersive element according to claim 1, wherein the at least two optical interfaces are positioned such that the collimated light is incident on the interfaces at a tilted angle with respect to surface normals of the at least two optical interfaces, respectively.

7. A dispersive element according to claim 1, wherein the collimation cavity has optical lens shape and constitutes an air cavity inside the dispersive body having a lower index of refraction than the dispersive body.

8. A dispersive element according to claim 1, wherein the collection cavity has optical lens shape and constitutes an air cavity inside the dispersive body having a lower index of refraction than the dispersive body.

9. A dispersive element according to claim 1, wherein the collection cavity and/or collection cavity have spherical or cylindrical concave shape.

10. A spectrometer, comprising:
    a dispersive element according to claim 1;
    an entrance aperture positioned at a focal plane of the collimation cavity; and
    a detector positioned at a focal plane of the collection cavity to collect the multiple spatially separated wavelengths of light.

11. A spectrometer according to claim 10, wherein the entrance aperture is a slit, a pinhole or a fiber-tip.

12. A spectrometer according to claim 10 or 11, wherein the detector is a linear array detector or a two dimensional detector, in particular a Charge Coupled Device or a Complementary Metal Oxide Semiconductor.

13. A method to spectrally separate wavelengths of light incident on a dispersive element, wherein the dispersive element has a dispersive body made of an optically transparent material and comprising a collimation cavity, at least two optical interfaces, and a collection cavity, each filled with a material of lower index of refraction compared to an index of refraction of the dispersive body, the method comprising the steps of:

collimating the incident light using the collimation cavity;

receiving and dispersing the collimated light into multiple spatially separated wavelengths of light, using the at least two optical interfaces; and collecting and focusing the dispersed light using the collection cavity.

\* \* \* \* \*